United States Patent Office 2,829,029
Patented Apr. 1, 1958

2,829,029

COMPLEX OF BORON TRIFLUORIDE AND NITROGEN TRIOXIDE AND PROCESS FOR PRODUCING SAME

Gustave B. Bachman, Lafayette, Ind., and Takeo Hokama, Hilo, Territory of Hawaii, assignors to Purdue Research Foundation, Lafayette, Ind., a corporation No Drawing. Application October 3, 1956
Serial No. 613,611

5 Claims. (Cl. 23—14)

Our invention relates to a new composition of boron trifluoride and dinitrogen trioxide and more particularly, it relates to a complex between boron trifluoride and dinitrogen trioxide in a molar ratio of one to one and to the method of producing the same.

Kuhlmann, in 1841, reported in Ann. 39, 320 that boron trifluoride reacted with nitric oxide but he did not identify the product nor give any analytical data from which the composition of the product could be calculated. Batey and Sisler reported in the Journal of the American Chemical Society, vol. 74, page 3408, that when nitryl chloride was contacted with boron trifluoride, no reaction took place except that boron trifluoride did react with dinitrogen tetroxide impurity in the nitryl chloride to produce $N_2O_3 \cdot 2BF_3$, a white crystalline solid. Finlay reported in the Journal of Chemical Education, vol. 24, page 149, that the compound $BF_3 \cdot NO$ could be made by cooling a mixture of NO and $BF_3$ in a sealed tube. Bachman, Feuer, Bluestein and Vogt reported in Journal of the American Chemical Cociety, volume 77, page 6188, the preparation of the complex $BF_3 \cdot N_2O_4$.

We have now discovered a new composition which is a complex between boron trifluoride and dinitrogen trioxide, $BF_3 \cdot N_2O_3$. Our new composition and the method of producing it have not previously been described. The complex $BF_3 \cdot N_2O_3$ is a stable, white, powdery solid which is hygroscopic and is decomposed upon exposure to moisture. The new complex is essentially insoluble in all solvents with which it does not react. Decomposition of the complex occurs with such solvents as ethanol, ethyl ether, acetone, acetic acid, and pyridine. Solvents which do not decompose the complex readily at room temperature and below include nitroparaffins, petroleum ether, cyclohexane, carbon tetrachloride, chloroform, and nitrobenzene. Attempts to determine a melting point in sealed tubes resulted in no liquid phase up to 290° C., although considerable dissociation occurred as evidenced by the formation of red-brown fumes. The combining weights of boron trifluoride and dinitrogen trioxide were determined carefully employing gravimetric methods and the structure $BF_3 \cdot N_2O_3$ thereby corroborated.

As indicated above, our new composition is insoluble in most solvents with which it does not react. Water and most organic solvents containing oxygen atoms react rapidly to destroy the complex with the evolution of gaseous by-products or reaction products with the solvents. The complex is essentially insoluble in solvents with which it does not react such as those mentioned above so that the complex can safely be stored in these materials at room temperature or below.

Our new complex of boron trifluoride and dinitrogen trioxide can be prepared by reacting boron trifluoride with dinitrogen trioxide. The reaction is exothermic and must be carried out under carefully controlled temperature conditions. The reaction can be carried out by passing gaseous boron trifluoride into a solution of dinitrogen trioxide in a nitroparaffin solvent. The reaction can be carried out by passing gaseous boron trifluoride into liquid dinitrogen trioxide but we prefer to employ the inert solvent such as a nitroparaffin mentioned above. The completion of the reaction is indicated by the disappearance of the blue color of dinitrogen trioxide and the evolution of unreacted white boron trifluoride fumes. When the reactants are contacted, the insoluble complex is produced and is precipitated from the reaction mixture. The complex is stable in the nitroparaffins as indicated above and may be stored for some time in this manner. However, the solid complex may be isolated by vacuum filtration although a dry atmosphere is required to prevent decomposition of the complex by the moisture in the air. Dry liquid dinitrogen trioxide can be obtained by saturating dry liquid dinitrogen tetroxide with nitric oxide at −70° C. The dry liquid dinitrogen tetroxide can be obtained by the method of Henderson and Fernelius, Organic Preparations, McGraw-Hill Book Co., Inc. (1935), page 44.

We prefer to place dry nitromethane or nitroethane in a suitable container and add dry liquid dinitrogen tetroxide to the cooled solvent after which the nitric oxide gas is slowly bubbled into the solution while the temperature is lowered to −70° C. The low temperature is employed to minimize the dissociation of dinitrogen trioxide. When brown fumes begin to be emitted from the solution as a result of unabsorbed nitric oxide being oxidized to nitrogen dioxide by the air, the nitric oxide flow is stopped and we then pass the gaseous boron trifluoride into the reaction vessel to product the boron trifluoride-dinitrogen trioxide complex as indicated above. The yield of the complex is essentially quantitative.

The following example is offered to illustrate the production of our new complex but we do not intend to be limited to the particular materials, proportions, or procedures shown. Rather we intend to include within the scope of our invention all equivalents obvious to those skilled in the art.

Example I

A 300-ml. portion of dry nitroethane was placed in a three-neck 500 ml. flask fitted with a stirrer, a reflux condenser with a drying tube and a gas inlet tube which extended just below the surface of the nitroethane. The flask was cooled to −20° C. after which 23 grams of dry liquid dinitrogen tetroxide was added and then dry nitric oxide slowly bubbled into the solution, the temperature being lowered to −70° C. during the introduction of the nitric oxide. Complete saturation of the dinitrogen tetroxide was indicated by the oxidation of nitric oxide to brown nitrogen dioxide at the mouth of the condenser. Gaseous boron trifluoride was then bubbled into the reaction vessel until dense white fumes were observed emitting from the top of the condenser and the blue color of dinitrogen trioxide disappeared. The white solid complex of dinitrogen trioxide and boron trifluoride precipitated from the solution as it was being formed. The yield was quantitative.

Our new complex of boron trifluoride and dinitrogen trioxide is a useful diazotizing agent and is useful in diazotizing primary aromatic amines, particularly weakly basic aromatic amines in non-aqueous solvents, and in preparing pure, dry, stabilized diazonium salts. The reaction is not limited to the diazotization of weakly basic aromatic amines, however, the diazotization of such compounds is extremely troublesome using ordinary diazotization procedures because of the weak basicity of the compound. In carrying out the diazotization reaction, the material to be diazotized is contacted with the complex of boron trifluoride and dinitrogen trioxide and the resulting precipitated diazonium salt subsequently isolated.

Preferably we employ a 0.1 molar excess of the complex at a temperature ranging from about 0 to about 50° C. We prefer to employ an inert solvent in carrying out the diazotization reaction and since the complex is essentially insoluble in nearly all solvents with which it does not react, we mean by the term inert solvent, a solvent for the material being diazotized which is inert insofar as the complex is concerned, and obviously the inert solvent must be one with which the material to be diazotized does not react but in which it merely dissolves. Suitable solvents include chloroform, benzene, nitrobenzene, carbon tetrachloride, etc., if the solvents do not react with the particular material being diazotized.

The diazotization reaction is usually complete in 30 to 60 minutes and the insoluble diazonium salt can easily be isolated by filtration. The salts are stable and can be conveniently handled. Compounds which we have diazotized include aniline, 2,6-dibromo-4-nitroaniline, 2,4-dinitroaniline, tribromoaniline, 2-chloroaniline, 4-chloroaniline, 4-nitroaniline, 2,4-dinitro-1-naphthylamine, 2-nitro-p-phenylene diamine, and p-phenylene diamine. The diazonium salts obtained can be heated to form fluoro derivatives of the starting aromatic nucleus or if the diazotization is carried out using benzene as a solvent, sodium acetate can be added to form the corresponding biphenyl derivative. Also, the isolated diazonium salt may be coupled with phenols or reacted in aqueous solution with materials such as naphthol to form azo dyes or with iodides to form iodide derivatives.

The following example is offered to illustrate the manner in which our new complex of boron trifluoride and dinitrogen trioxide is employed in the diazotization of aniline.

*Example II*

A 4.6-gram portion of aniline was added dropwise to a suspension of 9 grams of the complex of boron trifluoride and dinitrogen trioxide in 150 ml. chloroform at a temperature of 2° C., with stirring. After 30 minutes, 20 ml. of ether was added to destroy the unreacted complex after which the mixture was stirred for an additional five minutes. The solution was filtered with suction to obtain the solid diazonium salt melting with decomposition at a temperature of 85–87° C. The diazonium salt was then coupled with 7.2 grams of 2-naphthol in 10% aqueous sodium hydroxide to obtain 11 grams of an orange azo dye having a melting point of 134° C.

Now having described our invention, what we claim is:

1. $BF_3 \cdot N_2O_3$.

2. A process for the production of a complex of boron trifluoride and dinitrogen trioxide having the formula $BF_3 \cdot N_2O_3$ which comprises contacting dry gaseous boron trifluoride with dry dinitrogen trioxide to produce a complex of boron trifluoride and dinitrogen trioxide as a white amorphous solid.

3. A process for the production of a complex of boron trifluoride and dinitrogen trioxide having the formula $BF_3 \cdot N_2O_3$ which comprises contacting dry liquid dinitrogen trioxide with gaseous boron trifluoride and separating a complex of boron trifluoride and dinitrogen trioxide as a white amorphous solid.

4. A process for the production of a complex of boron trifluoride and dinitrogen trioxide having the formula $BF_3 \cdot N_2O_3$ which comprises contacting dinitrogen trioxide with gaseous boron trifluoride in the presence of an inert solvent and separating the precipitated complex of boron trifluoride and dinitrogen trioxide from the inert solvent.

5. A process for the production of a complex of boron trifluoride and dinitrogen trioxide having the formula $BF_3 \cdot N_2O_3$ which comprises contacting dinitrogen trioxide with gaseous boron trifluoride in the presence of an inert solvent at a temperature of about $-70°$ C. and separating the precipitated complex of boron trifluoride and dinitrogen trioxide from the inert solvent.

References Cited in the file of this patent

UNITED STATES PATENTS

| | | |
|---|---|---|
| 1,320,443 | Bolton | Nov. 4, 1919 |
| 2,291,400 | Miller | July 28, 1942 |
| 2,607,658 | Govett et al. | Aug. 19, 1952 |

U. S. DEPARTMENT OF COMMERCE
PATENT OFFICE

CERTIFICATE OF CORRECTION

Patent No. 2,829,029     Gustave B. Bachman et al.     April 1, 1958

It is hereby certified that error appears in the printed specification of the above numbered patent requiring correction and that the said Letters Patent should read as corrected below.

Column 1, line 29, for "$N_2O_3 \cdot 2BF_3$," read -- $N_2O_4 \cdot 2BF_3$, --; line 34, for "American Chemical Cociety," read -- American Chemical Society, --; column 3, line 24, for "carried out" read -- carried our --.

Signed and sealed this 17th day of June 1958.

(SEAL)
Attest:
KARL H. AXLINE
Attesting Officer

ROBERT C. WATSON
Commissioner of Patents